US006793576B2

(12) United States Patent
Fujiwara et al.

(10) Patent No.: US 6,793,576 B2
(45) Date of Patent: Sep. 21, 2004

(54) METHODS AND APPARATUS FOR CAUSING A CHARACTER OBJECT TO OVERCOME AN OBSTACLE OBJECT

(75) Inventors: Tokuro Fujiwara, Osaka-fu (JP); Yuzo Sugano, Osaka-fu (JP); Masaya Watanabe, Kanagawa-ken (JP); Akira Koike, Tokyo (JP)

(73) Assignee: Sony Computer Entertainment Inc. (JP)

( * ) Notice: Subject to any disclaimer, the term of this patent is extended or adjusted under 35 U.S.C. 154(b) by 102 days.

(21) Appl. No.: 10/002,519

(22) Filed: Nov. 1, 2001

(65) Prior Publication Data
US 2002/0115483 A1 Aug. 22, 2002

(30) Foreign Application Priority Data

Nov. 1, 2000 (JP) ........................................ 2000-334493
Oct. 29, 2001 (JP) ........................................ 2001-330328

(51) Int. Cl.[7] .................................................. A63F 9/24
(52) U.S. Cl. ............................................ 463/7; 463/30
(58) Field of Search ........................... 463/1, 7, 30–32, 463/34, 37–38, 43–44

(56) References Cited

U.S. PATENT DOCUMENTS 4,752,069 A * 6/1988 Okada ........................ 463/23
5,513,307 A * 4/1996 Naka et al. .................. 345/474
6,226,008 B1 * 5/2001 Watanabe et al. ........... 345/427
6,283,861 B1 * 9/2001 Kawai et al. ................. 463/43
2002/0019257 A1 * 2/2002 Koizumi et al. .............. 463/32

FOREIGN PATENT DOCUMENTS

| EP | 0 778 547 A1 | 6/1996 |
| EP | 1 002 561 A3 | 4/2002 |
| JP | 09222881 | 8/1997 |
| JP | 2000-153061 | 6/2000 |

* cited by examiner

Primary Examiner—Kim Nguyen
(74) Attorney, Agent, or Firm—Lerner, David, Littenberg, Krumholz & Mentlik, LLP

(57) ABSTRACT

When obstacles inhibiting the progression of a character being operated on a screen with a controller are encountered, obstacle overcoming actions corresponding to the state of the character may be performed with a simple operation. An obstacle overcoming button is determined beforehand in the program. The character has perimeter ranges corresponding to its own speed. In the event that the obstacle object is a building, a perimeter range is also provided to a wall of the obstacle object, for example, and an obstacle overcoming table corresponding to the overlapping relations of the mutual perimeter ranges is created beforehand. In the event the obstacle overcoming button is operated and the perimeter range of the character and the perimeter range of the wall overlap, an action of jumping over the obstacle object, for example, is automatically invoked.

21 Claims, 17 Drawing Sheets

| PERIMETER RANGE | CHARACTER ACTION |
|---|---|
| AD3 | DESTROY DOOR AND ENTER |
| AD2 | |
| AD1 | OPEN DOOR AND ENTER |
| AD0 | |

| PERIMETER RANGE | CHARACTOR ACTION |
|---|---|
| AD3 | RUNNING JUMP |
| AD2 | |
| AD1 | STANDING JUMP |
| AD0 | |

METHODS AND APPARATUS FOR CAUSING A CHARACTER OBJECT TO OVERCOME AN OBSTACLE OBJECT

CROSS REFERENCE TO RELATED APPLICATIONS

The present application claims priority from Japanese application Nos. 2000-334493 filed Nov. 1, 2000 and 2001-330328 filed Oct. 29, 2001, the disclosures of which are hereby incorporated by reference herein.

BACKGROUND OF THE INVENTION

The present invention relates to a recording medium storing a program wherein a game proceeds by an object such as a character moving on a screen overcoming obstacle objects, such as rivers, rocks, and so forth, the method thereof, and a program executing system and program executing device whereby the program is executed.

Entertainment apparatuses capable of executing game programs such as video games or the like have become commonplace. An operating device and a display device are electrically connected to the entertainment apparatus.

With such entertainment apparatuses, characters displayed in a display screen based on operations made by the operator (user or player) of the operating devices are caused to perform various actions such as dashing, jumping, kicking, and so forth. This allows the characters to defeat enemy characters, avoid dangers, and so forth. The game program is executed in such a manner, thus carrying out the story, object, etc., thereof.

With conventional game programs, in the event that the character on the screen encounters a terrain which cannot be navigated, for example, the game is arranged such that the user can operate direction buttons or the like to move the character vertically or horizontally, or operating a button appropriated for an act of escaping the terrain so as to jump or so forth, thereby escaping the terrain which cannot be navigated.

However, in reality, such actions of escaping the terrain (actions enabling obstacles such as terrain which cannot be navigated to be overcome) are often enabled only in the event that player instantaneously grasps the state of the character on the screen and performs appropriate operating input. Accordingly, there is the problem that this may be difficult for beginning players in particular.

SUMMARY OF THE INVENTION

The present invention has been made in light of the above-described problems, and accordingly, it is an object thereof to provide a recording medium storing a program wherein, in the event that an object such as a character or the like displayed on a screen encounters an obstacle object on the screen, the obstacle object can be readily overcome, the method thereof, and a program executing system and program executing device whereby the program is executed.

The recording medium according to the present invention stores a program for causing character objects displayed on a screen to perform predetermined actions with operating output as commands from an operating device having a plurality of operating portions, the program including code for an obstacle overcoming step whereby, in the event the character object encounters an obstacle object on the screen, the obstacle object is automatically overcome by operating a particular one of the plurality of operating portions. Accordingly, the obstacle objects can be readily overcome.

In this case, obstacle overcoming actions corresponding to the current state of the character object may be programmed so as to be executed in the obstacle overcoming step, enabling the obstacle objects to be overcome in a more realistic manner.

The obstacle overcoming actions may be saved as attribute data correlated with the obstacle object, and obstacle overcoming actions corresponding to the current state of the character object may be predetermined in the attributes data, so that obstacle overcoming actions can be executed in an appropriate and smooth manner corresponding to the type of obstacle object, for example.

The current state of the character object may be the current speed of movement of the character object.

In the event that the character object can mount and thus pass over the obstacle object, the obstacle overcoming action may be a jumping-over action when the current speed of movement of the character object is relatively fast, and may be a scaling action when the current speed of movement of the character object is relatively slow, so as to execute actions harmonized with the state of the character object.

The program executing system according to the present invention includes a program executing device for reading and executing programs stored in a recording medium; an operating device connected to the program executing device and having a plurality of operating portions for outputting operating requests by an operator to the program executing device; and a display device having a screen for displaying images output from the program executing device; the program executing device including a storing unit storing a program read from the recording medium for causing a character object displayed on the screen of the display device to perform predetermined actions with operating output from the operating device as commands thereof, the program including code for automatically overcoming an obstacle object encountered by the character object on the screen by operating a particular one of the plurality of operating portions of the operating device; and an executing unit for reading and executing the program stored in the storing unit.

According to the present invention, in the event that a character object encounters an obstacle object on the screen, the operator can overcome the obstacle object with simple operations of the operating device.

The program executing device according to the present invention, which is connectable to an operating device having a plurality of operating portions for outputting operating requests by an operator and a display device having a screen for displaying images, includes a storing unit storing a program for causing a character object displayed on the screen of the display device to perform predetermined actions with operating output from the operating device as commands thereof, the program including code for automatically overcoming an obstacle object encountered by the character object on the screen by operating a particular one of the plurality of operating portions of the operating device; and an executing unit for reading and executing the program stored in the storing unit.

According to the present invention, in the event that a character object encounters an obstacle object on the screen, the operator can overcome the obstacle object with simple operations of the operating device.

DETAILED DESCRIPTION

An embodiment of the present invention will be described with reference to the drawings.

Figure 1:
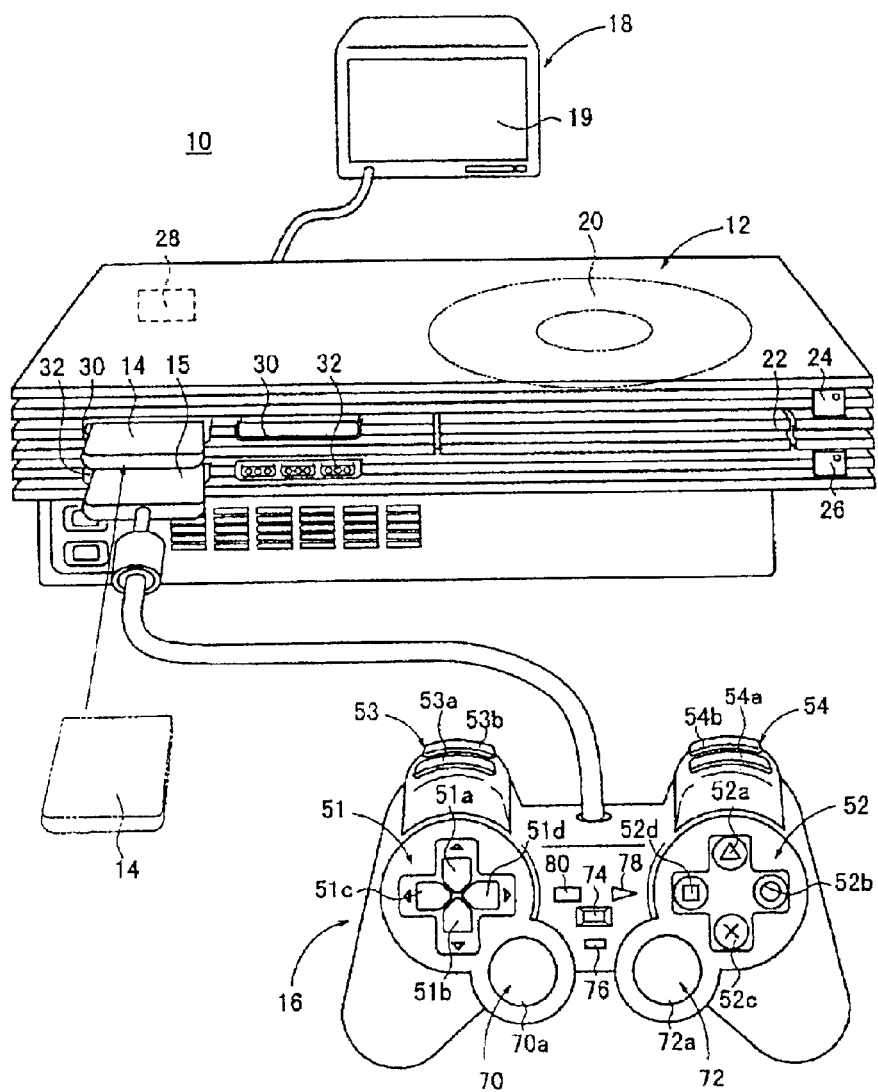
FIG. 1 is a configuration diagram of an entertainment system wherein an embodiment of the present invention has been applied.

FIG. 1 illustrates a schematic external view of an entertainment system 10, as an example of a program executing system to which an embodiment of the present invention has been applied.

This entertainment system 10 is basically configured of an entertainment device 12 serving as a program executing device having functions for executing various programs and so forth, a memory card 14 which is a card-type external storing device (external memory) which is detachable from the entertainment device 12, an operating device (controller) 16 which is detachably connected to the entertainment device 12 by a connector 15 for externally inputting instructions of operating requests from an operator (player) to the entertainment device 12, and a display device (monitor or display) 18 such as a television receiver or the like for displaying pictures and outputting audio based on supplied picture and audio signals output from the entertainment device 12. Such an entertainment system 10 is integrally formed.

The entertainment device 12 is of a shape with flat rectangular parallelepipeds placed one upon another. The front panel thereof has a disk tray 22 which moves forwards and backwards to serve as a disk mounting unit where optical disks 20 which are program data recording media are mounted, a reset switch 24 for arbitrarily resetting programs and the like currently being executed and so forth, an open button 26 for extracting the disk tray 22, two insertion slots 30 for memory cards 14, two controller terminals 32 wherein connectors 15 for controllers 16 are inserted, and so forth. The rear side thereof has a power switch 28, an unshown AV (Audio Visual) multi-output terminal which is a picture and audio output terminal connected to a monitor 18 via an AV cable, and so forth.

The entertainment device 12 has various functions, such as control functions for reading programs from optical disks 20 serving as recording media, such as CD-ROMs, DVD-ROMs, etc., wherein programs and data for computer games (video games) are recorded, and executing the games, thereby displaying characters and scenes on the monitor 18, as well as various control functions for reproducing pictures from DVDs (Digital Versatile (or Video) Disks) and playing music from CDDA (Compact Disk Digital Audio), and other like optical disks 20. The entertainment device 12 also has functions for executing program obtained by communication via communication networks and the like. Three-dimensional computer graphics pictures generated by the entertainment device 12 are displayed on the screen 19 of the monitor 18 serving as the display device while executing the game program.

In this case, signals from the controllers 16 are also processed by one of the aforementioned control functions of the entertainment device 12, and the contents thereof are reflected in, for example, the movement of character objects (hereafter simply referred to as "characters"), switching over of characters, switching over of scenes, and so forth on the screen of the monitor 18.

The controller 16 has first and second operating portions 51 and 52 formed to the left and right of the center on the upper face thereof, with third and fourth operating portions 53 and 54 formed on the sides thereof, and a left stick 70 and a right stick 72 serving as joysticks for making analog operations to the right and left of the front side of the upper face. The left and right sticks 70 and 72 serving as operating levers generate output according to the direction that each are inclined in the X-Y orthogonal direction, and the degree of inclination. For example, these have the functions of moving an object such as a character displayed on the monitor 18 to the right and left, forwards and backwards, by operating the left stick 70.

While not shown in the drawings, the left and right sticks 70 and 72 are provided with vibrating motors in the driving portions thereof, such that vibrations are applied to the left and right sticks 70 and 72 by instructions of the program.

The first operating portion 51 is a pressing operating portion for providing actions to characters and the like displayed on the monitor 18 for example, and the functions thereof are set by the program or the like recorded in the optical disk 20. The first operating portion 51 is formed of four operating keys (also called "direction keys") 51a, 51b, 51c, and 51d having functions for moving characters and the like up, down, left, right, and so forth. The direction key 51a is also referred to as the "up" key, the direction key 51b as the "down" key, the direction key 51c as the "left" key, and the direction key 51d as the "right" key.

The second operating unit 52 has four cylindrical operating buttons 52a, 52b, 52c, and 52d, for pressing operations. The tops of the operating buttons 52a through 52d are marked with the identification marks of "triangle (Δ)", "circle (○)", "cross (X)", and "square (□)", so the operating buttons 52a through 52d are also referred to as "triangle button 52a", "circle button 52b", "cross button 52c", and "square button 52d".

The functions of the operating buttons 52a through 52d on the second operating unit 52 are set by the program or the like recorded in the optical disk 20, and functions for moving the left arm, right arm, left leg, and right leg, of the character, are appropriated to the operating buttons 52a through 52d, for example.

The third and fourth operating portions 53 and 54 are of approximately the same structure, both having two pressing operating buttons arrayed vertically, i.e., an operating button 53a (also referred to as the "L1 button") and an operating button 53b (also referred to as the "L2 button"), and an operating button 54a (also referred to as the "R1 button"), an operating button 54b (also referred to as the "R2 button").

The functions of the third and fourth operating portions 53 and 54 are also set by the program or the like recorded in the optical disk 20. The third and fourth operating portions 53 and 54 are appropriated with functions for causing the characters to perform special actions, or functions for changing the characters, for example.

The left and right sticks 70 and 72 each comprise signal input elements such as variable resistors or the like, so as to be rotatable in 360° on the operating axis. The left and right sticks 70 and 72 each have an unshown elastic member, so as to return to a neutral position. Also, at this neutral position, the left and right sticks 70 and 72 respectively have functions of operating buttons 70a (L3 button) and 72a (R3 button) serving as the fifth an sixth operating portions for pressing operations.

Rotationally operating the left and right sticks 70 and 72 allows command signals to be input which enable analog motions such as, for example, rotating a character or the like while in motion, or moving while changing the speed thereof, or further changing the state thereof.

Figure 2:
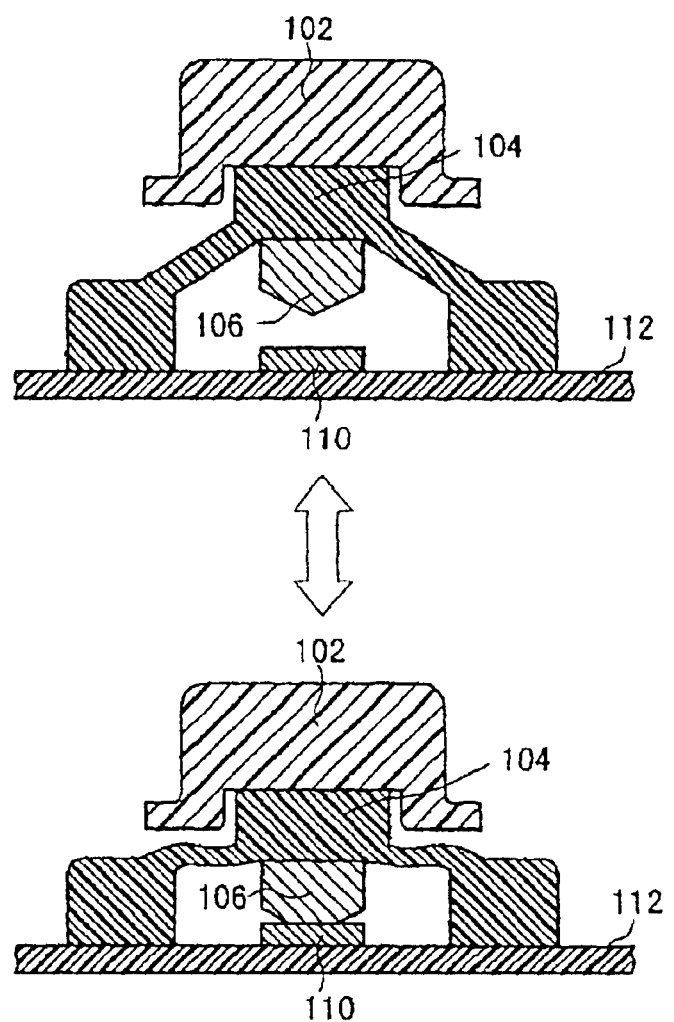
FIG. 2 is a cross-sectional diagram provided for description of the actions of a pressure-sensitive device.
Figure 3:
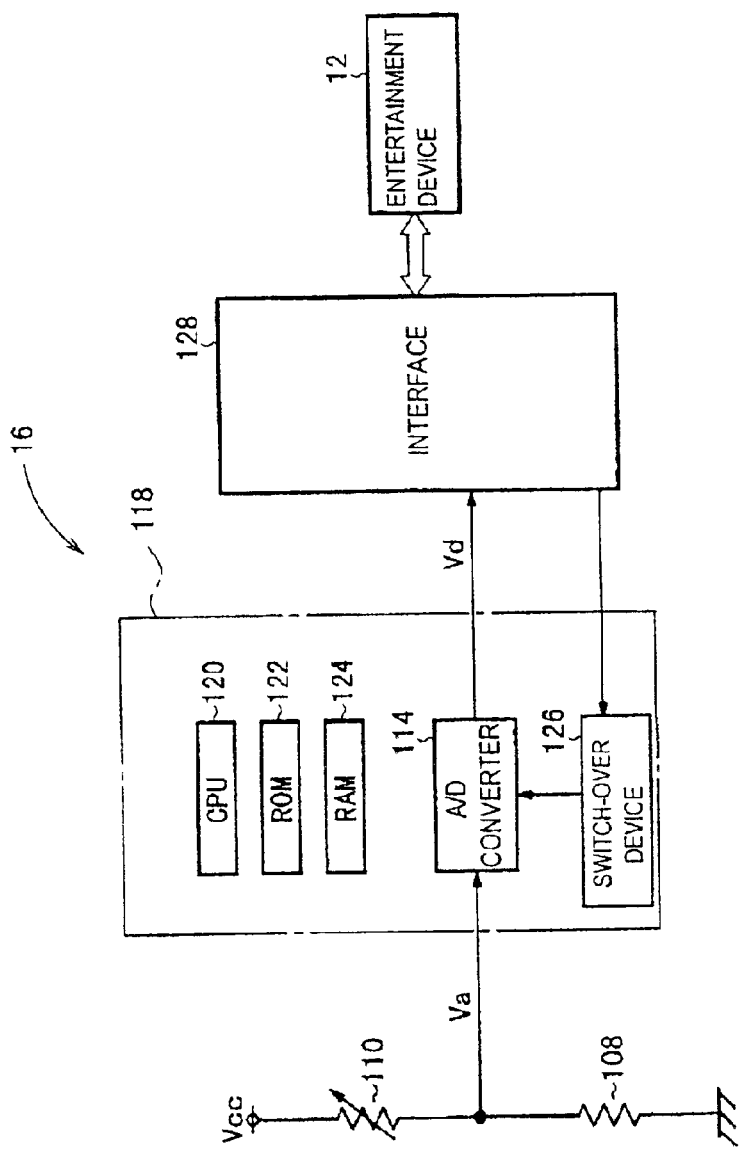
FIG. 3 is a circuit block diagram provided for description of the actions of a controller.

The rear sides of each of the direction keys 51a through 51d making up the first operating portion 51, the operating buttons 52a through 52d making up the second operating portion 52, the L1 and L2 buttons 53a and 53b and the R1 and R2 buttons 54a and 54b making up the third and fourth operating portions 53 and 54, and the L3 and R3 operating buttons 70a and 72a making up the fifth and sixth operating portions (representatively referred to as "operating element 102") are provided with an elastic electroconductive member 106 which is wide at the base and comes to a point at the apex which is at the center thereof, via an insulating elastic member 104, as shown in FIGS. 2 and 3. A resistor 110 with one end thereof connected to a voltage source Vcc and the other end thereof connected to a fixed resistor 108 is opposed at each position facing each electroconductive member 106. The resistor 110 is disposed on an insulating substrate 112, and the other end of the fixed resistor 108 is grounded.

In this case, in the event that the direction keys 51a through 51d, the operating buttons 52a through 52d, the L1 and L2 buttons 53a and 53b and the R1 and R2 buttons 54a and 54b, and the operating buttons 70a and 72a (operating elements 102) are pressed, the electroconductive member 106 comes into contact with the opposing resistor 110, and the apparent resistor value of the resistor 110 changes corresponding to the area of contact between the resistor 110 and the electroconductive member 106 according to the pressure applied thereto. The divided voltage value (analog signal) Va between the resistor 110 and the resistor 108 changes, and this becomes the input signals to an A/D converter 114.

Thus, a pressure-sensitive element is formed of an electroconductive member 106 and a resistor 110, and the electrical resistance values of the pressure-sensitive element change according to the pressing force applied by the operating element 102.

Note that FIG. 2 illustrates the action of the pressure-sensitive element serving as the element for outputting signal output proportionate to the pressing force, and FIG. 3 illustrates the configuration of the principal components of the controller 16.

As shown in FIG. 3, the controller 16 has an MPU (Microprocessor Unit) 118 serving as control means, with the MPU 118 containing a CPU 120 serving as control means, and ROM 122 and RAM 124 mutually connected therewith. Also, the MPU 118 is provided with a switch-over device 126 of which actions are controlled by the CPU 120, and the A/D converter 114. Analog signals (voltage) Va output from the output terminal of the resistor 110 are input to the A/D converter 114, and converted into digital signals Vd.

The digital signal Vd output from the A/D converter 114 is sent to the entertainment device 12 via an interface 128 provided on an interior substrate in the controller 16. The motions and the like of game characters for example are executed based on the digital signals Vd.

The change in level of the analog signal Va output from the output terminal of the resistor 110 corresponds to the change in the pressing force applied from the operating element 102, as described above. Also, the digital signal Vd output from the A/D converter 114 corresponds to the pressing force applied by the user (operator or player) to the operating elements 102. Controlling the movement and the like of game characters with digital signals having such correlation to the pressing operation by the user allows movements to be realized which are smoother in an analog manner than those realized by control with the binary digital signals of "1" and "0".

Now, the controller 16 is constructed so as to control the switch-over device 126 via the interface 128 by control signals sent from the entertainment device 12, based on the program recorded on the optical disk 20. That is to say, at the time of executing the program recorded on the optical disk 20, control signals are output from the entertainment device 12, specifying, according to the contents of the program, whether to cause the A/D converting unit 114 as means for outputting multi-value digital signals Vd with values from 0 through 255 for example, or to function as means for outputting binary on/off digital signals Vd with the values of "0" and "1". The switch-over device 126 selects and switches over the functions of the A/D converting unit 114 (binary output or multi output) based on these control signals. Accordingly, whether binary output is used or multi-value output is used, is determined by the program.

In FIG. 1, the left and right sticks 70 and 72, and the first and second operating portions 51 and 52, can be switched over from one to another for use. The switching thereof is performed by an analog mode switch 74. In the event that the left and right sticks 70 and 72 also serving as joysticks are selected by the analog mode switch 74, a display portion 76 is lit, thus indicating that the left and right sticks 70 and 72 are in the selected state.

The left and right sticks 70 and 72 generate voltage of 0 to ±127 steps in both the X and Y directions. This voltage is also supplied to the A/D converting unit 114 as analog signals Va and converted to digital signals Vd, and then supplied to the entertainment device 12 via the interface 128. Multiple A/D converting units 114 may be used.

Also provided on the controller 16 are a start button (start switch) 78 for instructing starting of a game, a selection button (selection switch) 80 for selecting the difficulty of the game when starting the game, and so forth.

Figure 4:
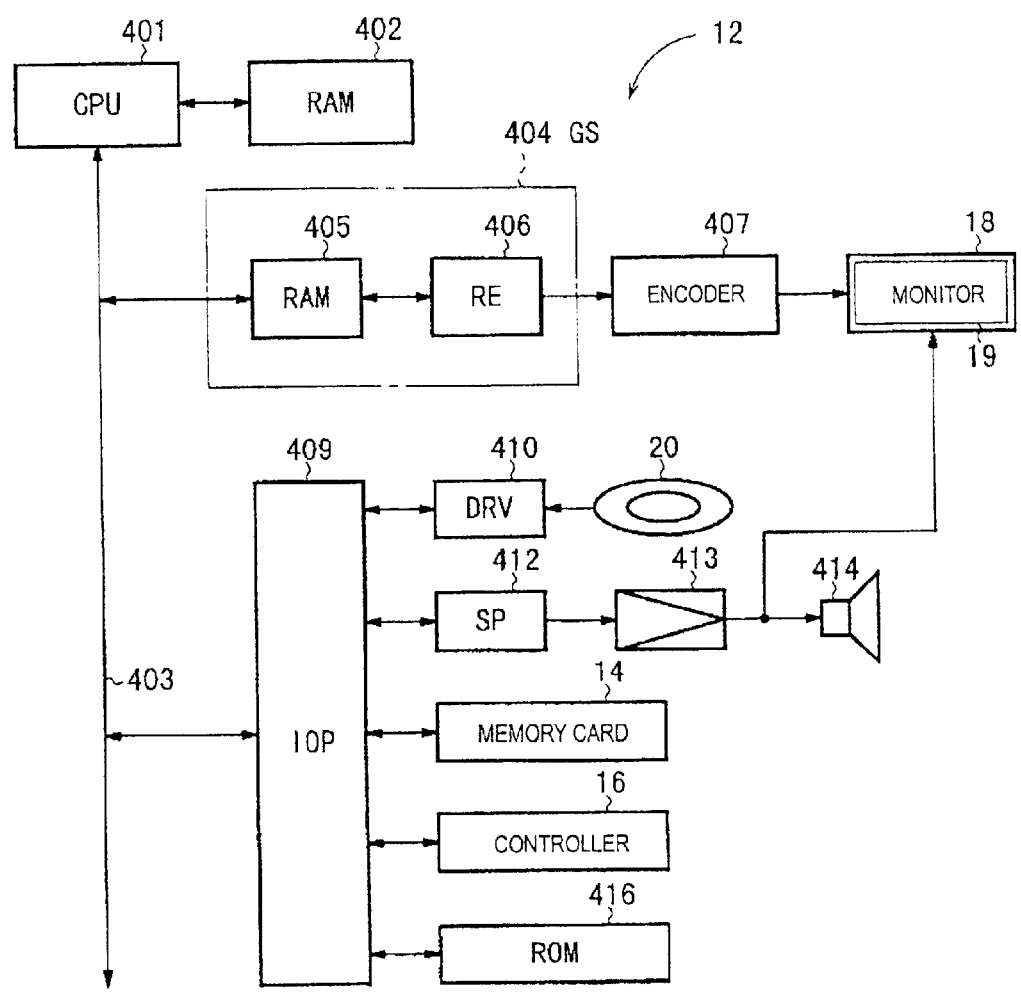
FIG. 4 is a block diagram of an entertainment system.

Next, the internal configuration of the entertainment system 10 shown in FIG. 1 and the general actions thereof will be described with reference to the block diagram shown in FIG. 4.

RAM 402 which is semiconductor memory, and a bus 403, are each connected to a CPU 401, which serves as a computer and an executing unit (executing means). In this case, the RAM 402 also functions as a storing unit (storing means) for sequentially storing programs containing data recorded in the optical disk 20. The CPU 401 also functions as an executing unit for reading out programs within the RAM 402 serving as the storing unit or within the optical disk 20 and executing the programs.

A graphic synthesizer (GS) 404 and an input/output processor (IOP) 409 are each connected to the bus 403. Contained in the GS 404 are RAM 405 including a frame buffer, Z buffer, texture memory, etc., and a rendering engine 406 having rendering functions including drawing functions to the frame buffer within the RAM 405.

The GS 404 thus configured is connected to a monitor 18 serving as an external device, via an encoder 407 for converting digital RGB signals or the like for example, into NTSC standard television signals.

Connected to the IOP 409 are a driver (DRV) 410 for reproducing and decoding data recorded in the optical disk 20, a sound processor (SP) 412, a memory card 14 formed of flash memory serving as external memory, the controller 16, and ROM 416 storing an operating system and the like. The SP 412 is connected to a speaker 414 and monitor 18 serving as external devices, via an amplifier 413, thereby supplying audio signals.

Now, the memory card 14 is a card-type external storing device formed of a CPU or gate array and flash memory, and is detachably inserted to an insertion slot 30 of the entertainment device 12 shown in FIG. 1, and the partway state of the game, programs for DVD reproduction, and so forth, are stored in the memory card 14.

The controller 16 is for providing commands (binary commands or multi commands) to the entertainment device 12 by pressing the multiple buttons or operating the joysticks arrayed on the controller 16. Also, the driver 410 has a decoder for decoding encoded images based on the MPEG (Moving Picture Experts Group) standard.

Next, how images are displayed on the monitor 18 by operating the controller 16 will be schematically described.

It is to be understood as a presupposition that the object data made up of polygon apex data and texture data and the like recorded on the optical disk 20, and data on the world coordinates WC of this object data, are read in via a driver 410, and are held in the RAM 402 of the CPU 401.

Figure 5:
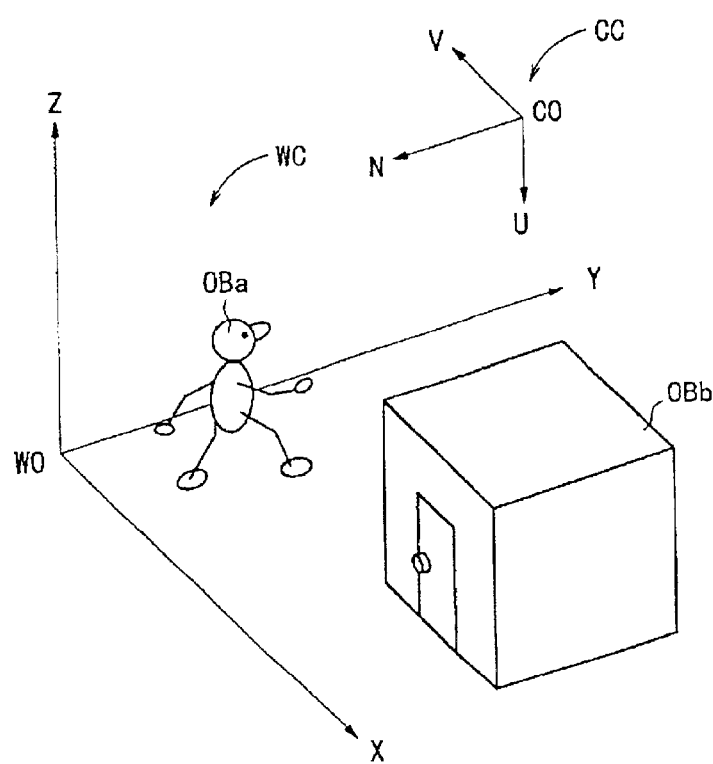
FIG. 5 is an explanatory diagram provided for correlated description of world coordinates and camera coordinates.

FIG. 5 schematically illustrates the state of objects OBa and OBb of object data being positioned on the three-dimensional world coordinates WC comprising the three orthogonal axes of X, Y, and Z, with the world coordinates point of origin WO. Note that the object OBa represents the character object, and may also be referred to as "character OBa". The object OBb is an object representing a building, but sometimes is an obstacle to the character OBa, and accordingly may also be referred to as "obstacle object OBb". Also, an obstacle object OBb is a factor inhibiting progress of the game unless the player operates the controller 16 in an appropriate manner, and accordingly might also be referred to as a game progression inhibiting factor object.

Once instructions are input to the entertainment device 12 from the operator (player) via the controller 16, the CPU 401 computes the position of the object on the three-dimensional camera coordinates CC comprising the three orthogonal axes of V, U, and N, with the camera coordinates point of origin CO, and the orientation as to the viewpoint, based on the instructions. The coordinates point of origin CO of the camera coordinates CC is positioned in the later-described screen, in the middle thereof for example. Thus, the polygon apex data of the object defined by the coordinate values of the three orthogonal axes of X, Y, and Z is converted into the camera coordinates CC.

Figure 6:
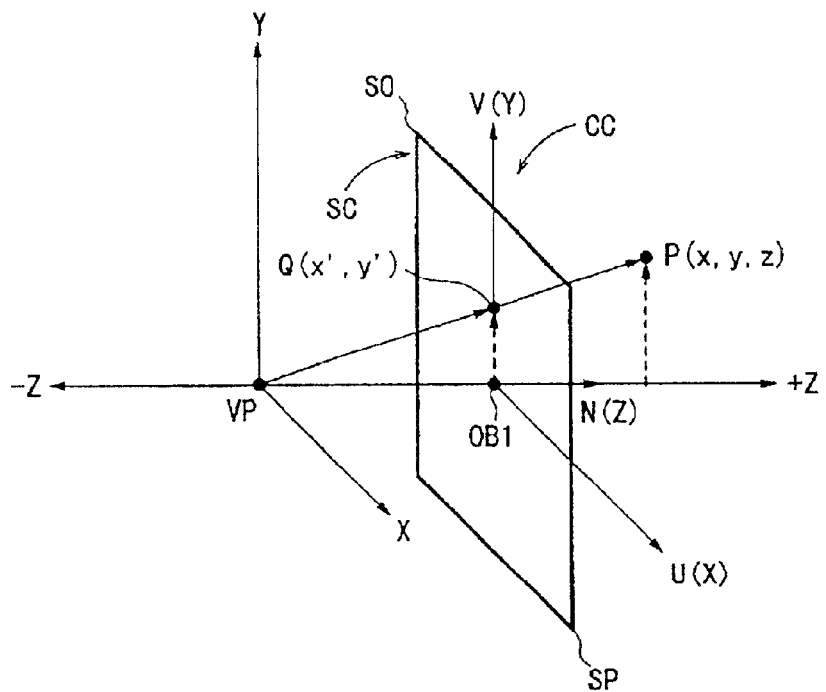
FIG. 6 is an explanatory diagram provided for correlated description of camera coordinates and screen coordinates.

Next, as schematically shown with one arrow line in FIG. 6, the polygon apex data P (x, y, z) following conversion to camera coordinates CC is converted into two-dimensional coordinates data Q (x', y') on the screen SP defined by screen coordinates SC having a screen coordinates point of origin SO (e.g., the upper left point on the screen SP) as the base point thereof, by transmittance conversion processing with the viewpoint VP as the reference.

The post-conversion two-dimensional X-Y coordinates data (x', y'), Z data (z), and texture data are supplied to the GS 404. The GS 404 performs rendering based on the post-conversion two-dimensional X-Y coordinates data (x', y') and Z data (z), and sequentially writes (draws) texture data to the RAM 405 serving as memory (in this case, the frame buffer), thereby carrying out the drawing processing. The texture data that is drawn is encoded by the encoder 407 as one frame of image completed by the drawing processing and supplied to the monitor 18, and is displayed as a three-dimensional image or a two-dimensional image on the screen 19.

The entertainment system 10 according to the present embodiment is basically configured and operates as described above. Next, the contents of the game program which runs on this entertainment system 10 will be described.

First, the specifications relating to the programmed actions and so forth of a player character (hereafter referred to simply as "character") serving as the character object OBa will be described.

Figure 7:
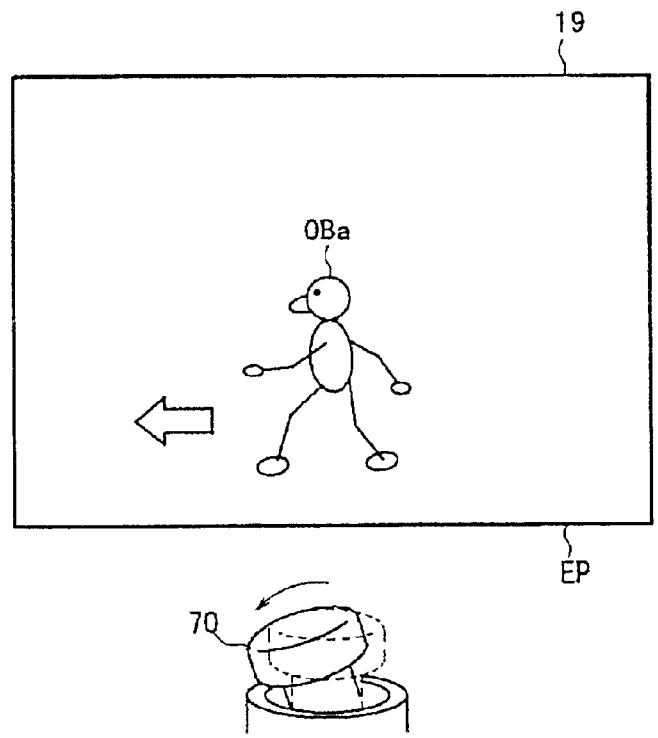
FIG. 7 is a diagram indicating the relation between the operations of the left stick and the movements of the character on the screen.

With the normal movement of the character OBa displayed on the screen 19 as shown in FIG. 7, the player tilts the left stick 70 in the direction as viewed on the screen 19 and inputs the direction with so-called objective operations. In FIG. 7, left stick 70 is tilted in the direction of the arrow, so the character OBa moves in the direction of the outlined arrow. This outlined arrow is not shown on the actual screen 19.

Figure 8:
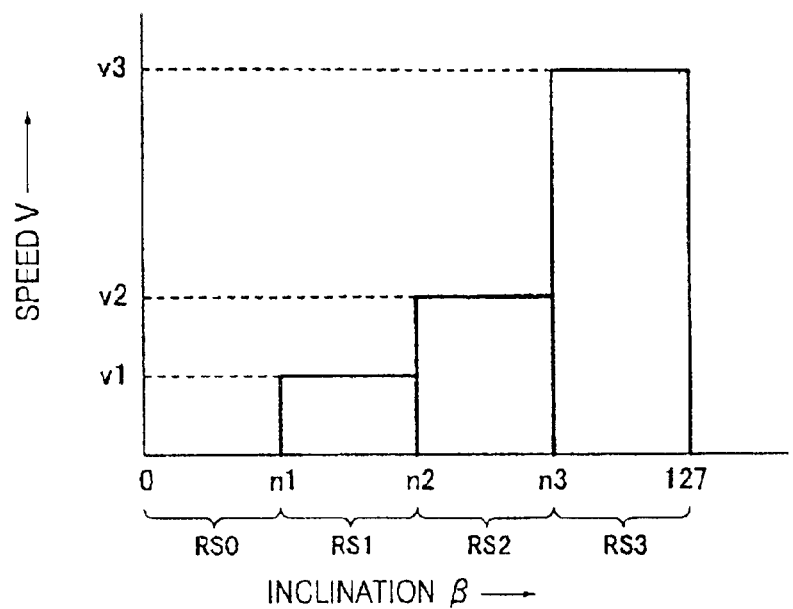
FIG. 8 is a table indicating the relation between the range of inclination of the left stick and the movement speed of the character.

FIG. 8 illustrates the relation between the inclination β of the left stick 70 (128 steps of 0 to ±127 in both the X and Y directions) and the movement speed v of the character OBa.

The range RS0 of inclination β=0 through n1 for the left stick 70 is taken to mean a stopped state (v=0), taking into consideration play in the stick, the range RS1 of inclination β=n1 through n2 means a speed v1 corresponding to a normal walking speed, the range RS2 of inclination β=n2 through n3 means a speed v2 corresponding to a fast walking speed, and the range RS3 of inclination β=n3 through 127 means a speed v3 corresponding to a running speed.

While the present embodiment is arranged such that the speed v2 is four times that of the speed v1 and the speed v3 is eight times that of the speed v1, this rate may be set as appropriate.

Also, the speed v is made to change with acceleration by changing of the inclination range RS, and also has inertia. That is to say, the speeds v1 through v3 each are the maximum speeds for the respective ranges RS1 through RS3.

Figure 9:
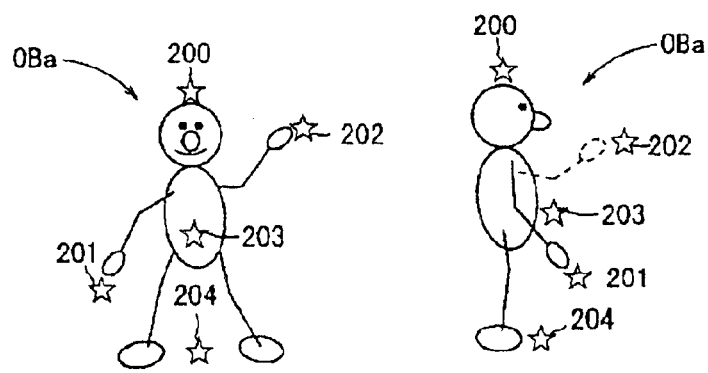
FIG. 9 is an explanatory diagram of the perimeter centers of a character.

As shown in FIG. 9, the character OBa has perimeter centers 200 through 204 at the apex of the head, the tops of the arms, at the waist, and between the feet. A perimeter range of 10 cm to several tens of cm is set for the perimeter centers 200 through 204 of the character OBa when stationary (these perimeter centers will be denoted by the symbol AD). The perimeter centers may be restricted to the apex of the head and between the feet and so forth. Here, the perimeter range AD is arranged so as to change according to the current speed v of the character OBa.

Figure 10:
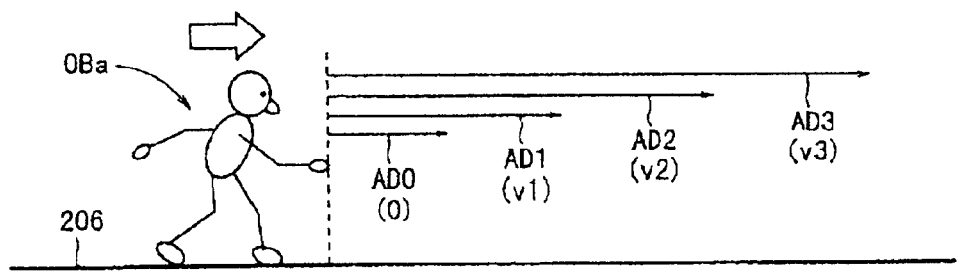
FIG. 10 is a diagram describing the relation between the perimeter ranges of the character and the speed of motion.

FIG. 10 illustrates the change in the perimeter range AD of the character OBa moving in the direction of the outlined arrow over the ground 206. The perimeter range AD is set at AD=AD0 in the event that the speed according to FIG. 8 is speed v=0, the perimeter range AD is set at AD=AD1 in the event that speed v=1, the perimeter range AD is set at AD=AD2 in the event that speed v=2, and the perimeter range AD is set at AD=AD3 in the event that speed v=3. The perimeter range AD is set so as to be greater in the direction of progression in proportion to the speed v.

Figure 11:
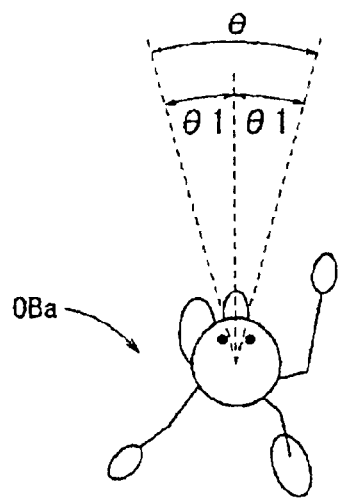
FIG. 11 is an explanatory diagram of the object recognition field of characters.

As shown in FIG. 11, the character OBa has a field of recognition θ for objects (object OBb), of an angle θ of around 30° to the right and left of view direction, which is expressed as ±θ1. Areas outside of this are outside of recognition. As described later, the character OBa is programmed so as to, at the time of pressing of the cross button 52c and so forth, react to objects within the field of recognition angle θ and also within the perimeter range AD, i.e., perimeter ranges overlapping the perimeter range AD, and execute actions to deal with the object.

Figure 12:
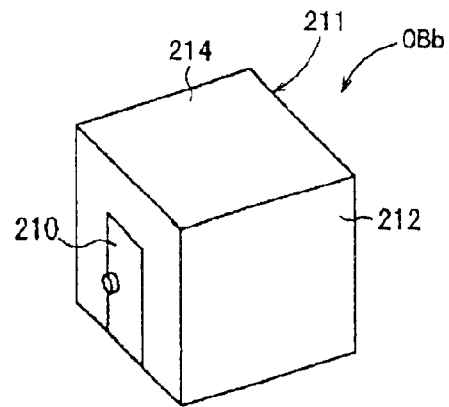
FIG. 12 is an explanatory diagram of an example obstacle object.

FIG. 12 illustrates an example of an object OBb. The object OBb which is a building 211 is made up of a door 210, walls 212, and a roof 214. Steps are formed between the ground and the walls 212, and between the walls 212 and the roof 214. Other aspects of the objects will be described in the later description of executing the program.

Figure 13:
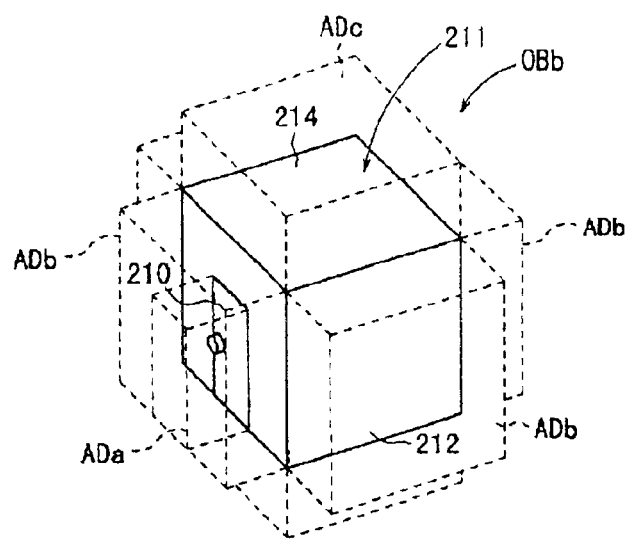
FIG. 13 is an explanatory diagram of the perimeter ranges of the obstacle object shown in FIG. 12.

FIG. 13 illustrates the perimeter range AD of the object OBb which is the building 211. There are, as perimeter ranges AD, the perimeter range ADa in front of the door 210, perimeter ranges ADb for the front, rear, and side walls 212, and perimeter range ADc above the roof 214. In the event that the object OBb is stationary and not moving, the perimeter ranges AD thereof do not change. Also, the perimeter ranges AD thereof may be made to match the outer surface positions of the object OBb.

Further, with this game program, various actions are spontaneously generated in the event that the player operates the cross button 52c which is a particular operating portion on the controller 16. For example, in the event that the character OBa encounters an obstacle object OBb on the screen, operating this cross button 52c generates an action which automatically overcomes the obstacle object OBb.

The actions automatically generated (automatically executed) by operating the cross button 52c are obstacle overcoming actions and the like corresponding to the current state of the character OBa, and the following three types of actions are programmed:

(1) Automatic transition to a moving action. Moving actions include jumping, crawling, swinging from bar to bar, climbing lattices, jumping onto steps, scaling steps, and so forth.

(2) Automatic transition to a checking action (looking up, looking down, etc.) or automatic transition to an action which will generate a checking action (opening a door, picking up an item, speaking to a person, and other like actions).

(3) Effects actions. Examples of this might include looking around at places where neither (1) nor (2) apply. Effects actions are canceled by operating the cross button 52c again.

Figure 14:
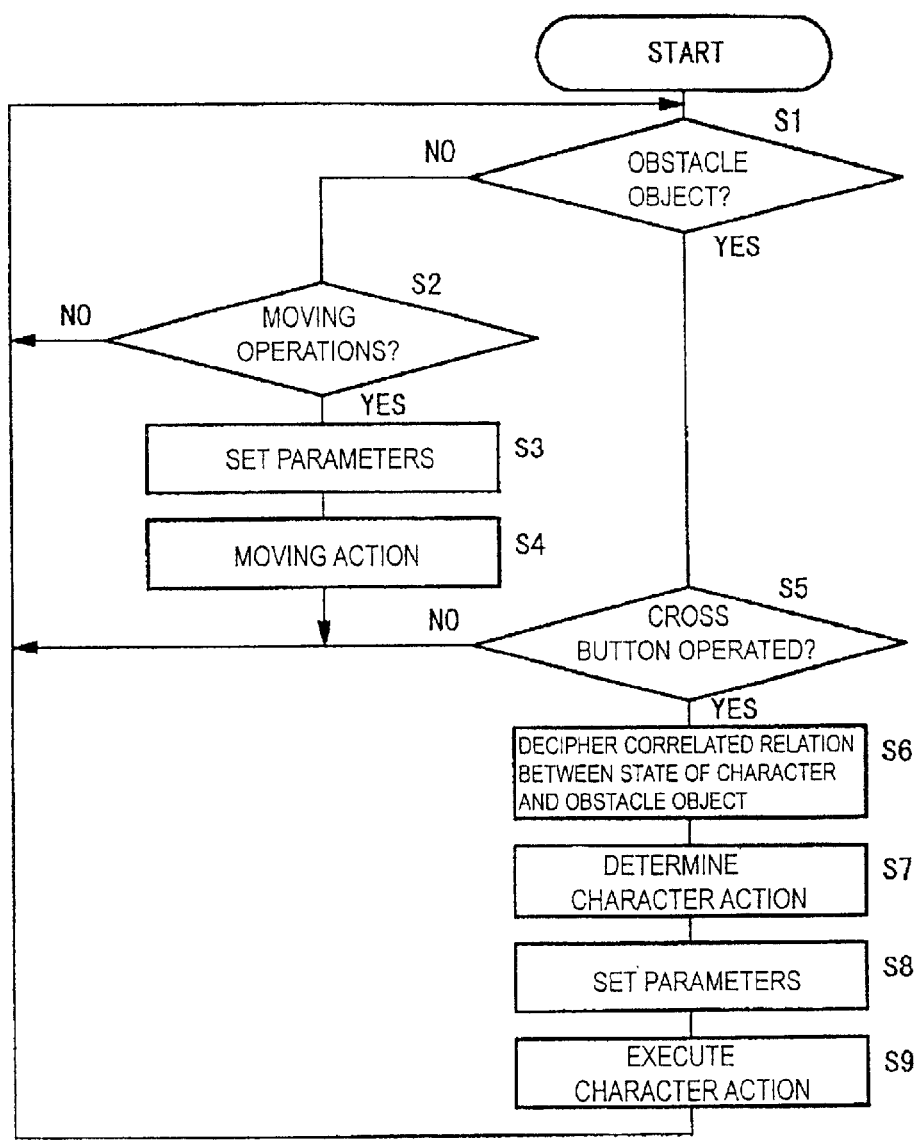
FIG. 14 is a flowchart indicating fundamental processing procedures for the primary components of the game program relating to the present invention.

FIG. 14 is a flowchart indicating fundamental processing procedures for the primary components of the game program. The game program is stored in an optical disk 20 which is a recording medium, written to RAM 402 by a predetermined amount via the DRV 410 and IOP 409 making up the entertainment device 12, read out by the CPU 401, and executed. Pictures (images) are displayed on the screen 19 of the monitor 18 via the GS 404 and encoder 407 as a result of the execution, and also audio is output from a speaker built into the monitor 18 or an external speaker 414, via the DRV 410, IOP 409, SP 412, and amplifier 413.

The fundamental processing procedures shown in FIG. 14 indicate processing partway through, following processing relating to the story or the like of the game program having already been started. The judging entity is the CPU 401.

First, in step S1, judgment is made regarding whether or not an obstacle object OBb which the character OBa cannot traverse has been detected. This judgment can be made based on whether or not an obstacle object OBb exists within a predetermined range in the direction of the line of view of the character OBa (e.g., this predetermined range is set so as to be within the perimeter range AD3 and the field of recognition θ and the within the screen 19 exceeding this).

In the event that an obstacle object OBb does not exist in step S1, judgment is made in step S2 regarding whether or not operating input for moving the character object OBa has been made i.e., whether or not there has been operating input of the left stick 70 equal to or exceeding a predetermined inclination angle. That is to say, judgment is made here regarding whether or not there has been operating input of the left stick 70 of the inclination ranges RS1 through RS3 within the inclination ranges RS shown in FIG. 8.

In the event that there has not been operating input of the inclination ranges RS1 through RS3, the flow returns to the processing in step S1, and in the event that there has been such operating input the flow proceeds to step S3, where parameters are set to a next-time display lest such that the movement speed v corresponds to the inclination range RS.

Based on the parameter settings, in step S4, drawing is performed for moving across the screen 19 at a predetermined speed v, such that movement of the character OBa at the moving speed v corresponding to the range RS of the inclination β is realized on the screen 19. Subsequently, the processing of step S1 is repeated.

On the other hand, in the judging processing in step S1, the event that an obstacle object OBb is detected, judgment is made in the processing in step S5 regarding whether or not the cross button 52c has been operated. In the event that there has been no operating input, the flow repeats the processing in step S1.

In the event that operating of the cross button 52c is detected in the judging processing in step S5, the correlated relation between the current state of the character OBa and the obstacle object OBb are deciphered in step S6.

Figure 15:
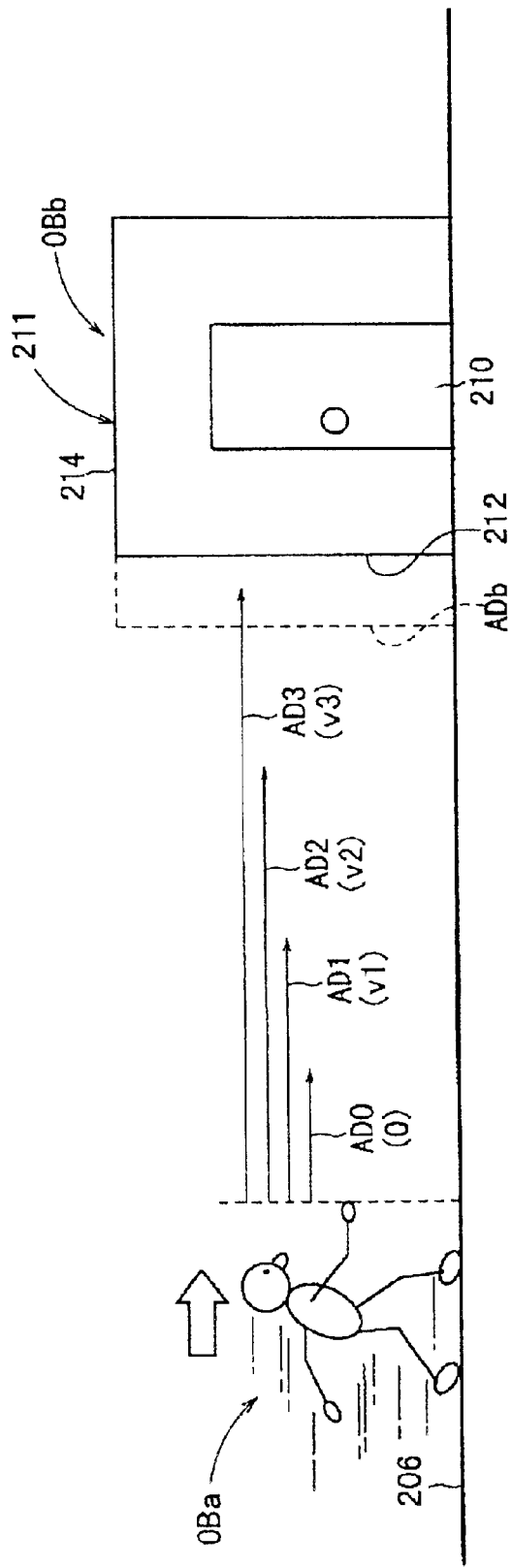
FIG. 15 is an explanatory diagram of perimeter judgment between a character and an obstacle object.

For example, in the event that the image on the screen 19 is in the current state shown in FIG. 15, the perimeter relation between the perimeter ranges AD0 through AD3 of the character OBa and the perimeter ranges ADa through ADc of the building 211 obstacle object OBb (i.e., the overlapping relation) is examined. Note that normally, the arrow lines indicating the perimeter ranges ADa through ADc and the dotted lines indicating the perimeter range ADb shown on the screen 19 corresponding to FIG. 15 are not displayed on the screen 19 (are not visible to the player), but an arrangement may be made so that these become visible to the player on the screen 19 by performing a special operation with the controller 16.

Figure 16:
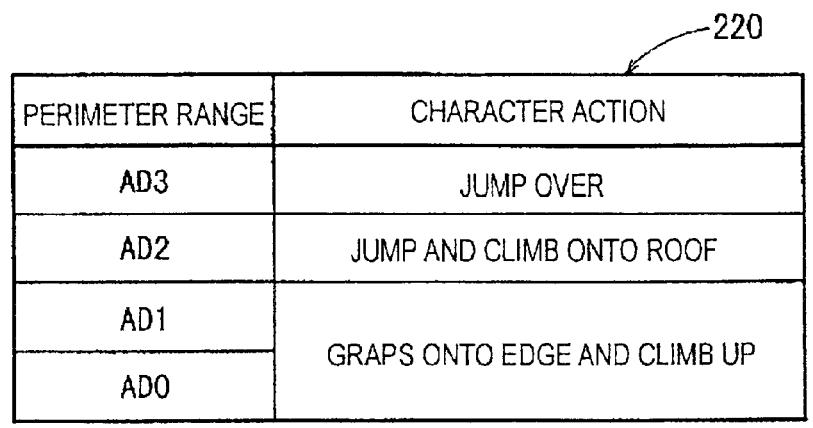
FIG. 16 is a obstacle overcoming table for determining character action based on the perimeter judgment.

In the event that judgment is made from the inspection results of the perimeter relations that the perimeter range AD3 of the character OBa and the perimeter range ADb of the wall 212 which is the obstacle object OBb overlap (the state shown in FIG. 15), reference is made to the obstacle overcoming table (an action invoking table for perimeter results) 220 shown in FIG. 16, this being attributes data which is correlated to the perimeter range ADb of the wall 212 and saved.

As shown in FIG. 16, the obstacle overcoming table 220 stipulates the correlated relation between the perimeter ranges AD0 through AD3 of the character OBa and character actions.

In the event that there is operation of the cross button 52c in the state of the example shown in FIG. 15, the perimeter range AD3 of the character OBa and the perimeter range ADb of the obstacle object OBb overlap, so in step S7, an action of jumping over is selected as the character action.

Accordingly, in step S8, parameters relating to the action of jumping over are set in the next time display list.

Figure 17A:
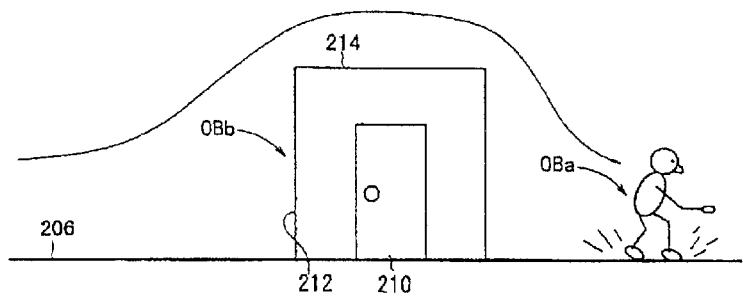
FIG. 17A is an explanatory diagram of character action jumping over an obstacle object.

Next, in step S9, a picture of the character action of jumping over is displayed on the screen 19, based on the parameter settings. As shown in FIG. 17A, the screen 19 displays a picture of the character OBa jumping over the obstacle object OBb.

Figure 17B:
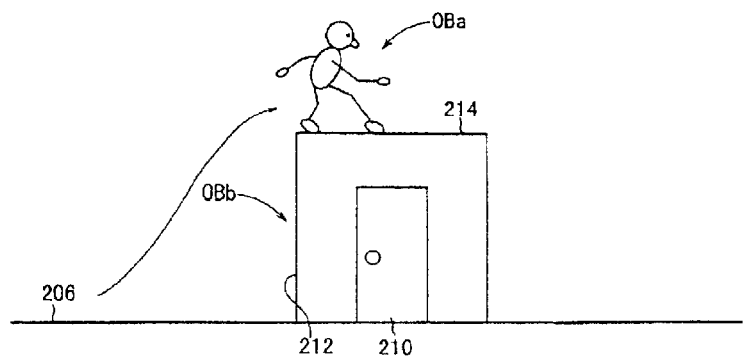
FIG. 17B is an explanatory diagram of character action jumping onto a roof which is an obstacle object.

Also, in the event that the judgment made in step S6 shows that perimeter range AD2 of the character OBa and the perimeter range ADb of the wall 212 which is the obstacle object OBb overlap, the processing of the steps S7 through S9 displays a picture on the screen 19 of the character OBa jumping onto the roof 214 of the obstacle object OBb and climbing up, as shown in FIG. 17B.

Figure 17C:
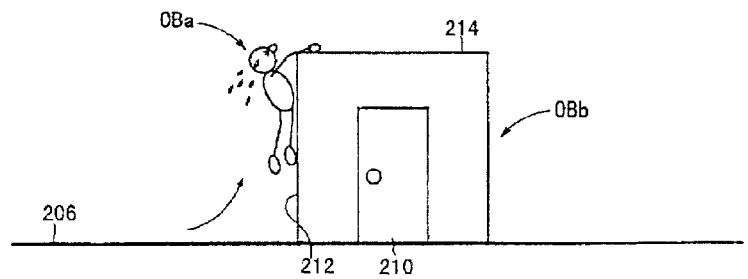
FIG. 17C is an explanatory diagram of character action scaling an obstacle object.

Further, in the event that the judgment made in step S6 shows that perimeter range AD1 or AD0 of the character OBa and the perimeter range ADb of the wall 212 which is the obstacle object OBb overlap, the processing of the steps S7 through S9 displays a picture on the screen 19 of the character OBa holding onto the edge of the roof 214 of the obstacle object OBb and then climbing up onto the roof 214, as shown in FIG. 17C.

Now, with regard to the perimeter ranges AD0 through AD3 of the character OBa, only one perimeter range (AD0, AD1, AD2, or AD3, out of AD0 through AD3) corresponding to the movement speed v which is the current state of the character OBa is provided to the character OBa, as described with reference to FIG. 10. That is to say, if the movement speed v changes, the perimeter range always changes to the one of AD0 through AD3 which corresponds to that movement speed v.

As shown in the examples in FIGS. 17A through 17C, in the event that the obstacle object OBb is the one which the character OBa can go over, there may be two obstacle overcoming actions, one being a jumping-over action in the event that the current speed of motion v of the character OBa is relatively fast as shown in FIG. 17A, and the other being a scaling action in the event that the current speed of motion of the character object OBa is slow as shown in FIG. 17C.

Figures 18, 19:
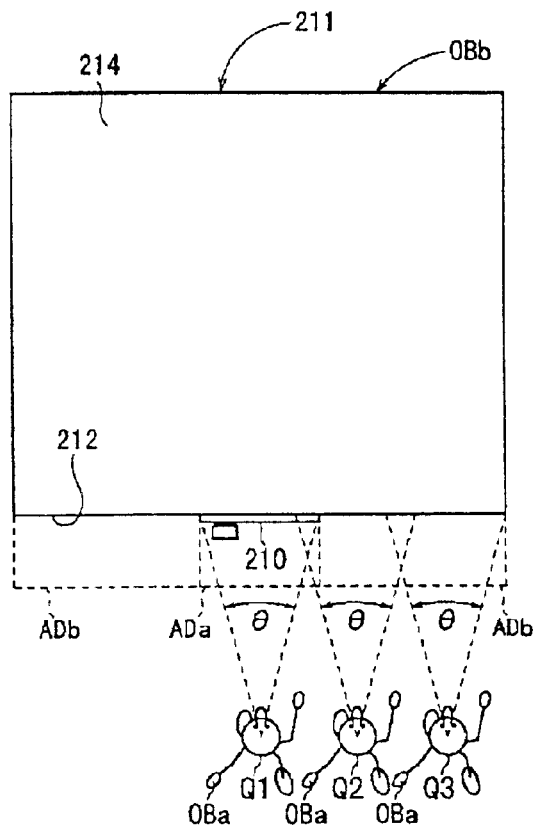
FIG. 18 is an explanatory diagram illustrating cases wherein the recognition field range of a character overlaps with the perimeter range of an obstacle object.
FIG. 19 is an obstacle overcoming table for determining character actions based on perimeter judgment.

As another example of perimeter judgment, description will be made regarding cases wherein the character OBa is situated (1) at a position Q1 in front of the door 210 of the obstacle object OBb, (2) at a position Q2 in front of both the door 210 and the wall 212, and (3) at a position Q3 in front of the wall 212, at the time of judging in step S6, as shown in FIG. 18, for example.

Now, as described with reference to FIG. 13, a perimeter range ADb of the wall 212 is set in front of the front wall 212 of the obstacle object OBb, and a perimeter range ADa of the door 210 is set in front of the door 210.

In the case (3) that the character OBa is situated at the position Q3 in front of the wall 212 at the front, i.e., in the event that only the wall 212 exists within the field of recognition θ of the character OBa, reference is made to the obstacle overcoming table 220 shown in FIG. 16, perimeter judgment is made, and the above-described character action is determined.

Also, in the case (1) that the character OBa is situated at the position Q1 in front of the door 210, i.e., in the event that only the door 210 exists within the field of recognition θ of the character OBa, reference is made to the obstacle overcoming table 222 shown in FIG. 19, which is attributes data saved correlated to the perimeter range ADb of the door 210.

In this case, in the event that the perimeter range AD2 or AD3 of the character OBa overlap the perimeter range ADb of the door 210, a picture of character action of the character OBa destroying the door 210 and entering the obstacle object OBb which is the building 211, is displayed. On the other hand, in the event that the perimeter range AD1 or AD0 of the character OBa overlap the perimeter range ADb of the door 210, a picture of character action of the character OBa opening the door 210 and entering the obstacle object OBb which is the building 211, is displayed.

Further, in the case (2) that the character OBa is situated at the position Q2 wherein both the door 210 and the wall 212 are within the field of recognition θ of the character OBa, priority is given to character action which is in this case character action relating to perimeter judgment regarding the door 210, over character action regarding the step on the wall 212 and so forth. Accordingly, in the event that the character OBa exists in the position Q2, reference is made to the obstacle overcoming table 222 (FIG. 19), which is attributes data saved correlated to the perimeter range ADa of the door 210, and character action is determined.

Figures 20, 21:
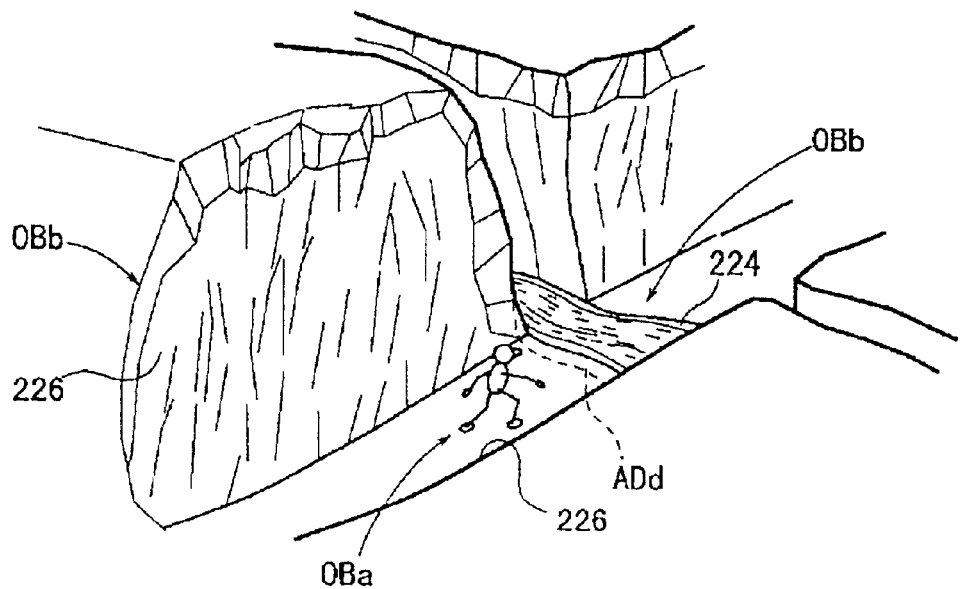
FIG. 20 is an explanatory diagram of character actions at the time of attempting to jump over a river.
FIG. 21 is an obstacle overcoming table for determining character actions based on perimeter judgment.

Next, description will be made regarding perimeter judgment with obstacle objects according to another example. FIG. 20 illustrates a state wherein the character OBa has encountered an obstacle object OBb which is a river 224 ahead, and obstacle objects OBb which are sheer cliffs 226 on either side.

At this time, it can be objectively understood that the character OBa must take some sort of special action to proceed any further. Let is say that the character OBa must jump over the obstacle object OBb which is the river 224 to proceed with the game. At this time, the player operates the cross button 52c which is the button for invoking character actions. The character OBa can jump over the obstacle object OBb which is the river 224 due to this operation.

In this case, reference is made to the obstacle overcoming table 228 shown in FIG. 21 relating to the perimeter ranges AD0 through AD3 of the character OBa and the perimeter range ADd of the river 224, and the corresponding jumping-over action is automatically selected. That is, in the event that the perimeter range AD3 or AD2 overlaps with the perimeter range ADd, a running jump action is invoked for the jumping-over action, and in the event that the perimeter range AD1 or AD0 overlaps with the perimeter range ADd, a standing jump action is invoked for the jumping-over action. Thus, in the event that the character OBa comes running up to the river 224, the character OBa can jump far across the river 224 even if the takeoff point is a good ways away from the river 224. In the event that the character OBa comes walking up to the river 224, the character OBa will jump across the river 224 from a point immediately by the river 224.

Figure 22A:
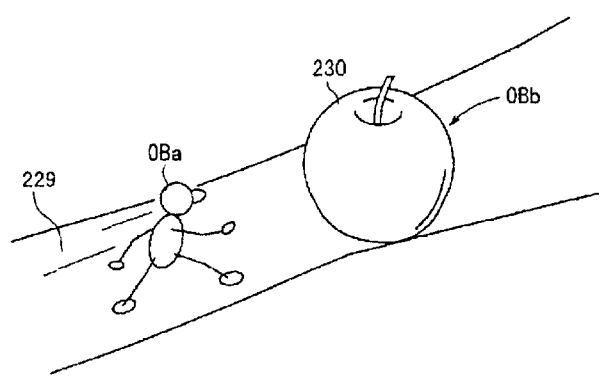
FIG. 22A is an explanatory diagram of character actions at the time of encountering a boulder while proceeding along a road.

Next, description will be made regarding perimeter judgment with obstacle objects according to yet another example. FIG. 22A illustrates a state of a character OBa which has been moving along a road 229 encountering ahead an obstacle object OBb which is a boulder 230 formed to look like an apple.

Figure 23:
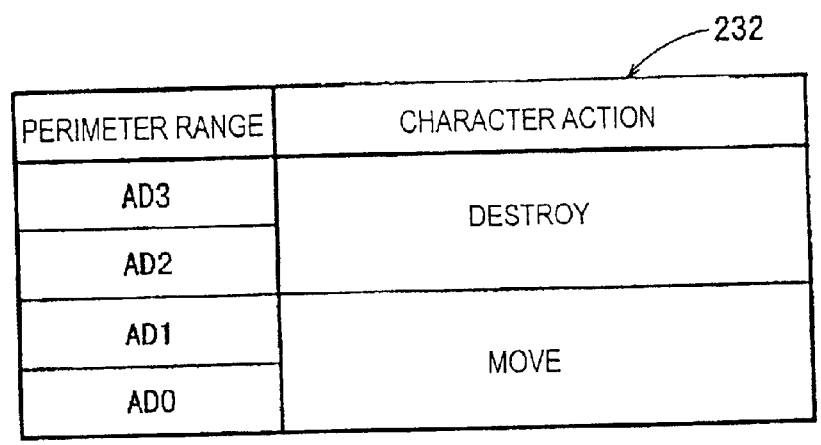
FIG. 23 is an obstacle overcoming table for determining character actions based on perimeter judgment.

At this time, it can be objectively understood that the character OBa must take some sort of special action to proceed any further. Accordingly, the player operates the cross button 52c which is the button for invoking character actions. Upon the cross button 52c being operated, reference is made to the obstacle overcoming table 232 shown in FIG. 23 relating to the attributes data saved correlated to the perimeter range ADe of the boulder 230, and character action is determined.

Figure 22B:
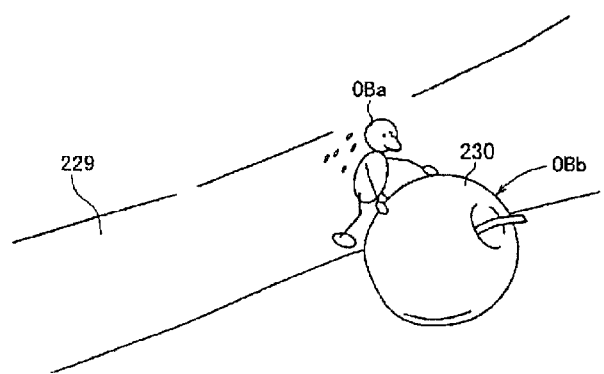
FIG. 22B is an explanatory diagram of the character actions of moving the boulder and proceeding.
Figure 22C:
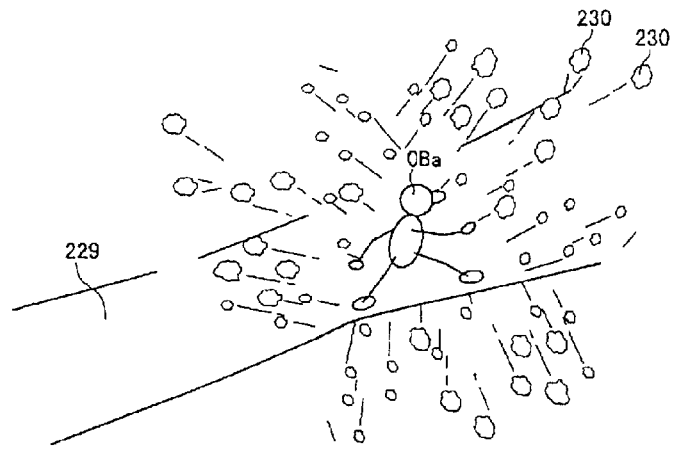
FIG. 22C is an explanatory diagram of the character actions of destroying the boulder and proceeding.

In this case, in the event that the perimeter range AD3 or AD2 of the character overlaps with the perimeter range ADe of the boulder 230, an action is invoked for destroying the boulder 230 and running through, as shown in FIG. 22C, and in the event that the perimeter range AD1 or AD0 overlaps with the perimeter range ADe of the boulder 230, an action is invoked wherein the character OBa moves the boulder 230 to the side and passes by, as shown in FIG. 22B.

Now, in the state shown in FIG. 22A, in the event that the only operation that is made is to tilt the left stick 70 in the direction of progression, the character OBa comes to a standstill in front of the boulder 230, and cannot pass along the road 229. In the event that the cross button 52c is operated in this standstill state, the action of grasping onto the edge of the wall 212 and climbing up as shown in FIG. 17C is invoked. In the event that, in the state of coming to a standstill in front of the wall 212, the character OBa is caused to retreat using the left stick 70 and then the cross button 52c is operated while tilting the left stick 70 in the direction of progression, the perimeter judgment shown in FIG. 15 is carried out, and an action jumping over the building 211, for example, can be invoked.

In the same manner, in the state shown in FIG. 15, only tilting the left stick 70 in the direction of progression means that character OBa comes to a standstill in front of the wall 212 of the building 211. In the event that the cross button 52c is operated in this standstill state, the action of moving this boulder 230 as shown in FIG. 22B is invoked.

Further, in the state shown in FIG. 20, in the event that the only operation that is performed is tilting the left stick 70 in the direction of progression, the character OBa falls in the river 224, resulting in the game ending, for example.

According to the above-described embodiments, in the event that a character object OBa on a screen 19 operated by a controller 16 encounters an obstacle object OBb such as terrain which apparently cannot be traversed, simply operating a single predetermined button, the cross button 52c, which has been appropriated beforehand for escaping processing by the program, allows the character object OBa to automatically overcome the obstacle object OBb.

Thus, the player does not need to perform troublesome operations wherein obstacle objects OBb such as terrain which apparently cannot be traversed is overcome only by operating multiple buttons at specific timings, as with the conventional art, and accordingly the player can enjoy the game more. Conversely, it can be said that providing the cross button 52c which is a player-automatic action invoking button has made the user interface more user friendly. Note that this single particular button is by no means restricted to the cross button 52c. For example, arrangements may be made wherein the character OBa is operated with operations of only the stick, by making this single particular button to be the L3 button 70a on the left stick 70 or the R3 button 72a on the right stick 72.

Also, the obstacle overcoming processing can be appropriately determined according to the current state of the character OBa, such as whether the character OBa is walking or running, how fast the character OBa is running, and/or conditions of the character OBa such as the weight of the character OBa or the like. Thus, a wide variety of processing can be performed according to the state, so the entertainment factor of the game can be further increased.

Further, it is needless to say that the object which the player operates on the screen 19 with the controller 16 is not restricted to the character OBa; rather, this can be applied to, for example, objects in which people might ride, such as vehicle objects, airplane objects, train objects, ship objects, and so forth. In the case of a vehicle object, for example, in the event that the vehicle is about to fall down a cliff or crash into an obstacle, appropriate actions can be invoked with a single button operation to avoid the state encountered.

Of course, the present invention is by no means restricted to the above embodiments; rather, various modifications and arrangements may be made without departing from the spirit and scope thereof.

As described above, according to the embodiment of present invention, in the event that a character object encounters an obstacle object on the screen while being operated, the obstacle object can be automatically overcome by operating a single particular operating portion. Accordingly, the player operating the character object can overcome or escape the obstacle object with a simple operation. That is, at the time of overcoming the obstacle object, instantaneous judgment and operations of the player are not needed as with the conventional art, so the player can readily overcome or escape the obstacle object. This is particularly advantageous in that beginning players in particular can smoothly proceed with the story or the like of the program.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A recording medium storing a program for causing a character object displayed on a screen to perform one of multiple possible predetermined actions to overcome an obstacle object based on an output from a user-operated device having a plurality of character object movement buttons and a separate action button, said program being operable to cause a processing system to perform steps, comprising:

detecting an output from said action button, said action button being operable to cause the character object to automatically overcome the obstacle object on said screen; and causing said character object to automatically overcome said obstacle object in accordance with said one of a plurality of predetermined actions associated with said obstacle object and in response to said detecting said output from said action button when said obstacle object is approached by said character object.

2. A recording medium according to claim 1, further comprising detecting a current state of said character object, wherein said causing said character object to automatically overcome said obstacle object includes executing an obstacle overcoming action corresponding to said current state of said character object.

3. A recording medium according to claim 2, further comprising: saving said obstacle overcoming action as attribute data in correlation with said obstacle object, wherein said obstacle overcoming action corresponding to said current state of said character object is predetermined in said attribute data.

4. A recording medium according to claim 2, wherein said current state of said character object is a current speed of movement of said character object.

5. A recording medium according to claim 4, wherein said obstacle overcoming action is at least one of: a jumping-over action when said current speed of movement of said character object is relatively fast, and a scaling action when said current speed of movement of said character object is relatively slow.

6. A recording medium according to claim 1, further comprising determining whether said character object encounters said obstacle object based on whether said obstacle object exists within a predetermined range along a line of view of said character object.

7. A recording medium according to claim 1, further comprising determining whether said character object encounters said obstacle object based on whether said obstacle object exists within a predetermined range along a line of view of the character object and whether a perimeter range of said character object and a perimeter range of said obstacle object overlap.

8. A processing system, comprising:

a program executing device operable to read a program stored in a recording medium, store said program in a storage device, and execute said program;

a user-operated device having a plurality of operating portions including character object movement buttons and separate action button for outputting respective operating requests by said user to said program executing device; and a display device having a screen for displaying an image output from said program executing device, wherein said program is operable to cause said program executing device to perform steps, comprising:

recognizing said respective operating requests from said user-operated device, said requests including actuation of said action button to cause a character object to automatically overcome an obstacle object on said screen; and causing said character object to automatically overcome said obstacle object in accordance with one of a plurality of predetermined actions associated with said obstacle object and in response to said detecting said actuation of said action button when said obstacle object is approached by said character object.

9. A processing system according to claim 8, wherein said program is operable to cause said program executing device to detect a current state of said character object, wherein said causing said character object to automatically overcome said obstacle object includes executing an obstacle overcoming action corresponding to said current state of said character object.

10. A processing system according to claim 9, wherein said program is operable to cause said program executing device to save said obstacle overcoming action as attribute data in correlation with said obstacle object, wherein said obstacle overcoming action corresponding to said current state of said character object is predetermined in said attribute data.

11. A processing system according to claim 9, wherein said current state of said character object is a current speed of movement of said character object.

12. A processing system according to claim 11, wherein said obstacle overcoming action is at least one of: a jumping-over action when said current speed of movement of said character object is relatively fast; and a scaling action when said current speed of movement of said character object is relatively slow.

13. A processing system according to claim 8, where said program is operable to cause said program executing device to determine whether said character object encounters said obstacle based on whether said obstacle object exists within a predetermined range along line of view of said character object.

14. A processing system according to claim 8, wherein said program is operable to cause said program executing device to determine whether said character object encounters said obstacle based on whether said obstacle object exists within a predetermined range along a line of view of the character object and whether a perimeter range of said character object and a perimeter range of said obstacle object overlap.

15. A program executing device which is connectable to a user-operated device having a plurality of operating portions including character object movement buttons and a separate action button for outputting respective operating requests by a user, and to a display device having a screen for displaying an image, said program executing device comprising:

a storing unit operable to store a program for causing said program executing device to perform steps, including:

recognizing said respective operating requests from said user-operated device, said requests including actuation of said action button to cause a character object to automatically overcome an obstacle object on said screen; and causing said character object automatically overcome said obstacle object in accordance with one of a plurality of predetermined actions associated with said obstacle object and in response to said detecting said actuation of said action button when said obstacle object is approached by said character object.

16. A program executing device according to claim 15, wherein said program is operable to cause said program executing device to detect a current state of said character object, wherein said causing said character object to automatically overcome said obstacle object includes executing an obstacle overcoming action corresponding to said current state of said character object.

17. A program executing device according to claim 16, wherein said program is operable to cause said program executing device to save said obstacle overcoming action as attribute data in correlation with said obstacle object, where said obstacle overcoming action corresponding to said current state of said character object is predetermined in said attribute data.

18. A program executing device according to claim 16, wherein said current state of said character object is a current speed of movement of said character object.

19. A program executing device according to claim 18, wherein said obstacle overcoming action is at least one of: a jumping-over action when said current speed of movement of said character object is relatively fast; and a scaling action when said current speed of movement of said character object is relatively slow.

20. A program executing device according to claim 15, wherein said program is operable to cause said program executing device to determine whether said character object encounters said obstacle object based on whether said obstacle object exists within in a predetermined range along a line of view of said character object.

21. A program executing device according to claim 15, wherein said program is operable to cause said program executing device to determine whether said character object encounters said obstacle object based on whether said obstacle object exists within a predetermined range along a line of view of the character object and whether a perimeter range of said character object and a perimeter range of said obstacle object overlap.

* * * * *

UNITED STATES PATENT AND TRADEMARK OFFICE
CERTIFICATE OF CORRECTION

PATENT NO. : 6,793,576 B2
DATED : September 21, 2004
INVENTOR(S) : Tokuro Fujiwara, Yuzo Sugano and Tsutomu Watanabe It is certified that error appears in the above-identified patent and that said Letters Patent is hereby corrected as shown below:

Column 1,
Line 55, after "overcome" delete ",".
Line 56, after "thereof" delete ",".

Column 6,
Line 44, "characters for example" should read --characters, for example, --.

Column 10,
Line 43, after "through" delete ",".
Line 54, "0" should read -- $\theta$ --.

Column 11,
Line 24, after "normally" delete ",".

Column 16,
Line 7, after "and" insert the word -- a --.

Column 17,
Line 8, after "object" insert the word -- to --.
Line 24, "where" should read -- wherein --.

Column 18,
Line 15, delete the word "in".

Signed and Sealed this

Fifteenth Day of March, 2005

JON W. DUDAS
*Director of the United States Patent and Trademark Office*